United States Patent
Mineikis et al.

(10) Patent No.: US 12,200,066 B2
(45) Date of Patent: Jan. 14, 2025

(54) VIRTUAL PRIVATE NETWORK CONNECTION MANAGEMENT

(71) Applicant: Oversec, UAB, Vilnius (LT)

(72) Inventors: Karolis Mineikis, Vilnius (LT); Lukas Baltrenas, Vilnius (LT); Edvardas Neznanovas, Vilnius (LT)

(73) Assignee: Oversec, UAB, Vilnius (LT)

( * ) Notice: Subject to any disclaimer, the term of this patent is extended or adjusted under 35 U.S.C. 154(b) by 469 days.

(21) Appl. No.: 17/686,987

(22) Filed: Mar. 4, 2022

(65) Prior Publication Data
US 2023/0283672 A1    Sep. 7, 2023

(51) Int. Cl.
*H04L 67/141* (2022.01)
*H04L 61/5007* (2022.01)
*H04L 67/145* (2022.01)
*H04L 12/46* (2006.01)

(52) U.S. Cl.
CPC ........ *H04L 67/141* (2013.01); *H04L 61/5007* (2022.05); *H04L 67/145* (2013.01); *H04L 12/4641* (2013.01)

(58) Field of Classification Search
None
See application file for complete search history.

(56) References Cited

U.S. PATENT DOCUMENTS

| | | |
|---|---|---|
| 6,704,732 B1 | 3/2004 | Barclay |
| 6,950,822 B1 | 9/2005 | Idicula et al. |
| 7,496,659 B1 | 2/2009 | Coverdill et al. |
| 7,940,695 B1 | 5/2011 | Bahadur et al. |
| 8,443,435 B1* | 5/2013 | Schroeder ............... H04L 63/08 726/15 |
| 8,955,099 B1 | 2/2015 | Varanasi et al. |
| 9,588,797 B2 | 3/2017 | Ashok et al. |
| 10,205,705 B2 | 2/2019 | Bakthavathsalu et al. |
| 11,196,719 B1 | 12/2021 | Nedzinskas |
| 11,418,599 B1 | 8/2022 | Lazauskas et al. |
| 11,477,176 B1 | 10/2022 | Gupta et al. |

(Continued)

OTHER PUBLICATIONS

NSTEC, How to Set Up Handshake in Private Internet Access Vpn?, https://www.nstec.com/how-to-set-up-handshake-in-private-internet-access-vpn/ CATHIE, Feb. 17, 2022, 6 pages.

(Continued)

*Primary Examiner* — Alex Skripnikov
(74) *Attorney, Agent, or Firm* — Young Basile Hanlon & MacFarlane, P.C.

(57) ABSTRACT

Virtual private network (VPN) service provider infrastructure (SPI) receives a request to access a VPN from a client device. The VPN SPI selects an Internet Protocol (IP) address for access to the VPN by the client device from a pool of IP addresses. The VPN SPI provides access to the VPN for the client device via the IP address. The VPN SPI receives one or more handshake notifications from the client device. The VPN SPI determines that a threshold time period has passed since a latest-in-time handshake notification of the one or more handshake notifications. The VPN SPI disconnects the client device from the VPN in response to determining that the threshold time period has passed. The VPN SPI adds the IP address to the pool of IP addresses in response to disconnecting the client device from the VPN.

21 Claims, 9 Drawing Sheets

(56) References Cited

U.S. PATENT DOCUMENTS

| | | |
|---|---|---|
| 11,558,469 B1 | 1/2023 | Neznanovas et al. |
| 11,627,191 B1 | 4/2023 | Ilcevic et al. |
| 11,647,084 B1 | 5/2023 | Uzkuras et al. |
| 11,665,141 B1 | 5/2023 | Ilcevic et al. |
| 2002/0046348 A1 | 4/2002 | Brustoloni |
| 2002/0167905 A1 | 11/2002 | Wenzel et al. |
| 2003/0041136 A1 | 2/2003 | Cheline et al. |
| 2006/0002397 A1 | 1/2006 | Xue et al. |
| 2006/0064698 A1 | 3/2006 | Miller et al. |
| 2006/0069775 A1 | 3/2006 | Artobello et al. |
| 2006/0206934 A1 | 9/2006 | Ammirata |
| 2007/0226630 A1 | 9/2007 | Farid et al. |
| 2008/0291839 A1 | 11/2008 | Hooper et al. |
| 2009/0077238 A1 | 3/2009 | Gao |
| 2009/0307522 A1 | 12/2009 | Olson et al. |
| 2009/0310551 A1 | 12/2009 | Hellgren et al. |
| 2009/0313468 A1 | 12/2009 | Hazlewood et al. |
| 2010/0102631 A1 | 4/2010 | Chiou |
| 2011/0314532 A1 | 12/2011 | Austin et al. |
| 2012/0005477 A1 | 1/2012 | Wei et al. |
| 2013/0159532 A1 | 6/2013 | Boero et al. |
| 2013/0205025 A1 | 8/2013 | Shamsee et al. |
| 2013/0290495 A1 | 10/2013 | Cheong |
| 2014/0160942 A1 | 6/2014 | Mandavilli et al. |
| 2014/0244839 A1 | 8/2014 | Yoon et al. |
| 2015/0146518 A1 | 5/2015 | Tan et al. |
| 2015/0188931 A1 | 7/2015 | Chari et al. |
| 2015/0195265 A1 | 7/2015 | Chen et al. |
| 2015/0261561 A1 | 9/2015 | Ashok et al. |
| 2016/0241403 A1 | 8/2016 | Lindemann |
| 2016/0308748 A1 | 10/2016 | Zuo et al. |
| 2018/0041509 A1 | 2/2018 | Nair |
| 2019/0028368 A1* | 1/2019 | Modi .................. H04L 41/0816 |
| 2019/0052482 A1 | 2/2019 | Yang et al. |
| 2019/0123955 A1 | 4/2019 | Chan et al. |
| 2019/0139063 A1 | 5/2019 | Lamm et al. |
| 2019/0394174 A1 | 12/2019 | Sillankorva et al. |
| 2020/0106687 A1 | 4/2020 | Nambisan et al. |
| 2020/0145515 A1 | 5/2020 | Fleck |
| 2020/0382341 A1 | 12/2020 | Ore et al. |
| 2021/0105254 A1 | 4/2021 | Walters et al. |
| 2022/0074264 A1 | 3/2022 | Wang et al. |
| 2022/0094616 A1 | 3/2022 | Modi et al. |
| 2022/0103398 A1* | 3/2022 | Hu ..................... H04L 12/4633 |
| 2022/0261270 A1 | 8/2022 | Gizis et al. |
| 2022/0263804 A1 | 8/2022 | Jasner et al. |
| 2022/0321401 A1 | 10/2022 | Vuggrala et al. |
| 2022/0368631 A1 | 11/2022 | Narula et al. |
| 2023/0283594 A1 | 9/2023 | Uzkuras et al. |
| 2023/0283671 A1 | 9/2023 | Mineikis et al. |
| 2023/0283672 A1 | 9/2023 | Mineikis et al. |
| 2023/0283675 A1 | 9/2023 | Pileckas et al. |
| 2023/0283676 A1 | 9/2023 | Ilcevic et al. |

OTHER PUBLICATIONS

ServerFault, Fix 'TLS Error: TLS handshake failed' on OpenVPN client—Server Fault, https://serverfault.com/questions.709860/fix-tls-error-tls-handshake-failed-on-openvpn-client, Apr. 13, 2017, 7 pages.

* cited by examiner

VIRTUAL PRIVATE NETWORK CONNECTION MANAGEMENT

BACKGROUND

A virtual private network (VPN) allows a computing device to access a public network without revealing private information (e.g., an address) of the computing device to the public network. However, maintaining VPN connections may require resources of a VPN server.

SUMMARY

Disclosed herein are implementations of virtual private network (VPN) connection status detection.

An aspect of the disclosure is a method of VPN connection status detection. VPN connection status detection comprises receiving a request to access a VPN from a client device. VPN connection status detection comprises selecting an Internet Protocol (IP) address for access to the VPN by the client device from a pool of IP addresses. VPN connection status detection comprises providing access to the VPN for the client device via the IP address. VPN connection status detection comprises receiving handshake notifications from the client device. VPN connection status detection comprises determining that a threshold time period has passed since a latest-in-time handshake notification of the handshake notifications. VPN connection status detection comprises disconnecting the client device from the VPN in response to determining that the threshold time period has passed. VPN connection status detection comprises adding the IP address to the pool of IP addresses in response to disconnecting the client device from the VPN.

An aspect of the disclosure is a system including processing circuitry and memory. The memory stores instructions which, when executed by the processing circuitry, cause the processing circuitry to perform VPN connection status detection. VPN connection status detection comprises receiving a request to access a VPN from a client device. VPN connection status detection comprises selecting an IP address for access to the VPN by the client device from a pool of IP addresses. VPN connection status detection comprises providing access to the VPN for the client device via the IP address. VPN connection status detection comprises receiving handshake notifications from the client device. VPN connection status detection comprises determining that a threshold time period has passed since a latest-in-time handshake notification of the handshake notifications. VPN connection status detection comprises disconnecting the client device from the VPN in response to determining that the threshold time period has passed. VPN connection status detection comprises adding the IP address to the pool of IP addresses in response to disconnecting the client device from the VPN.

An aspect of the disclosure is a machine-readable medium storing instructions which, when executed by a machine, cause the machine to perform VPN connection status detection. VPN connection status detection comprises receiving a request to access a VPN from a client device. VPN connection status detection comprises selecting an IP address for access to the VPN by the client device from a pool of IP addresses. VPN connection status detection comprises providing access to the VPN for the client device via the IP address. VPN connection status detection comprises receiving handshake notifications from the client device. VPN connection status detection comprises determining that a threshold time period has passed since a latest-in-time handshake notification of the handshake notifications. VPN connection status detection comprises disconnecting the client device from the VPN in response to determining that the threshold time period has passed. VPN connection status detection comprises adding the IP address to the pool of IP addresses in response to disconnecting the client device from the VPN.

In some implementations, the IP address is reserved for use solely by the client device from a time when the client device is provided access to the VPN until a time when the client device is disconnected from the VPN.

In some implementations, the pool of IP addresses corresponds to an account tier of a user of the client device.

In some implementations, VPN connection status detection further comprises authenticating the client device by verifying that an account used to login to a VPN service is a valid account.

In some implementations, authenticating the client device is based on a JavaScript token received from the client device.

In some implementations, authenticating the client device is based on a JavaScript Object Notation (JSON) Web Token (JWT) received from the client device.

In some implementations, receiving a handshake notification of the handshake notifications comprises: receiving a request, from the client device, to download or upload data via the VPN; and storing a timestamp associated with the request to download or upload the data.

In some implementations, determining that at least the threshold time period has passed comprises: determining that a time difference between the timestamp of the latest-in-time handshake notification and a current time exceeds the threshold time period.

In some implementations, receiving a handshake notification of the handshake notifications comprises: transmitting an echo request packet to the client device; and receiving an echo reply in response to the echo request packet.

In some implementations, the handshake notifications are received periodically from the client device.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
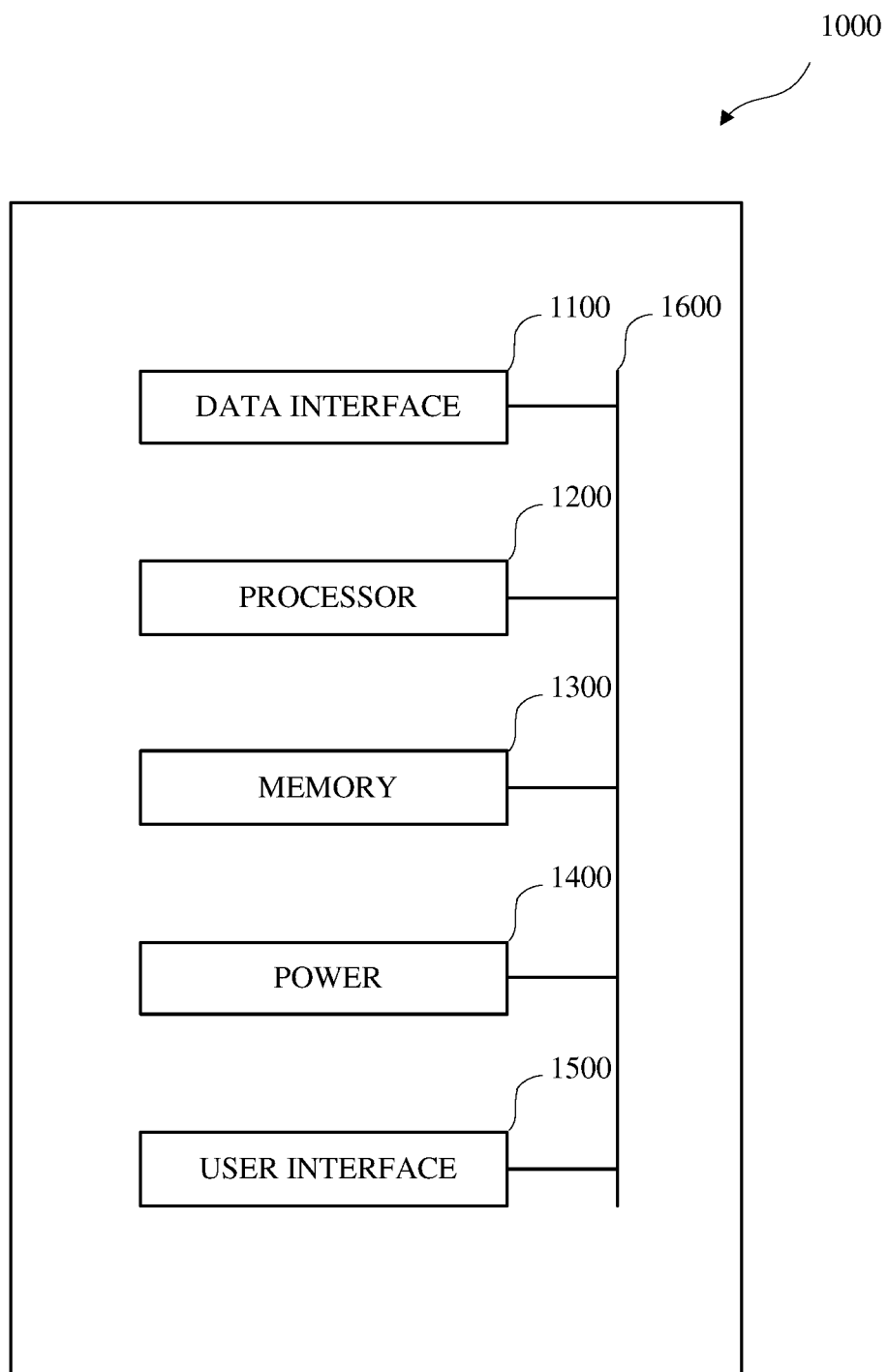
FIG. 1 is a block diagram of an example of a computing device.

A client device may access, via a virtual private network (VPN), a public network without revealing private information (e.g., an address) of the client device to the public network. To maintain the VPN connection of the client device, a VPN service provider infrastructure (SPI) may assign resources, including an Internet Protocol (IP) address from a pool of available IP addresses, to the client device. The IP address is used, by the client device, to access the VPN via the VPN SPI. After the client device is no longer communicating over the VPN, adding the IP address to a pool of available IP addresses is useful to ensure availability of IP addresses for other devices that may connect to the VPN.

According to some implementations, the VPN SPI described herein implements VPN connection status detection to verify whether a client device is connected the VPN. This allows resources that were allocated to the client device to be reallocated to other devices connecting to the VPN after the client device is no longer accessing the VPN. The VPN SPI receives a request to access a VPN associated with the VPN SPI from the client device. The VPN SPI selects an IP address for access to the VPN by the client device. The IP address is selected from a pool of IP addresses for use by client devices (including the client device) to access the VPN via the VPN SPI. The VPN SPI provides access to the VPN for the client device via the IP address. The VPN SPI receives one or more handshake notifications from the client device while the client device is communicating over the VPN. The handshake notification may include a request, by the client device, to download or upload data via the VPN or a response, from the client device, to a ping request. The VPN SPI determines that a threshold time period (e.g., 5 minutes or 10 minutes) has passed since the latest-in-time handshake notification from the client device. The VPN SPI disconnects the client device from the VPN in response to determining that the threshold time period has passed. The VPN SPI adds the IP address to the pool of IP addresses in response to disconnecting the client device from the VPN.

According to some implementations, the client device described herein implements VPN connection status management to ensure that the client device is connected to the VPN and notify a user of connection failures. The client device transmits a VPN connection request to a VPN SPI address. The client device transmits, using a ping service at the client device, one or more echo request packets to the VPN SPI address according to a connecting schedule (e.g., one packet every 0.5 seconds) from after the VPN connection request is transmitted until an echo reply is received. The echo reply is received, at the client device, responsive to an echo request packet. In response to receiving the echo reply, the client device determines that a VPN connection is established and transmits echo request packets to the VPN SPI address according to a VPN-connected schedule (e.g., one packet every 30 seconds). At a later time, the client device determines that the VPN connection is disconnected. In response to determining that the VPN connection is disconnected, the client device transmits a reconnection request to the VPN SPI address, and transmits echo request packets to the VPN SPI address according to a connection lost schedule (e.g., one packet every 15 seconds). After a certain time period (e.g., 2 minutes), if the client device fails to reconnect to the VPN, the client device notifies the user (e.g., via a graphical user interface), that the VPN has been disconnected.

According to some implementations, the VPN SPI disclosed herein implements VPN resource management to ensure that VPN resources are adequately managed and allocated to devices accessing the VPN of the VPN SPI. The VPN SPI receives a VPN connection request from a client device. The VPN connection request includes authentication credentials for authenticating the client device with a VPN service provider and a certificate that identifies the VPN service provider for the VPN connection request. The VPN SPI allocates resources (e.g., an IP address) of the VPN service provider to the client device to cause the client device to be connected to a VPN of the VPN service provider. At a later time, the VPN SPI determines that the client device has been inactive in the VPN for at least a threshold time period (e.g., 10 minutes) based on monitoring VPN activity of the client device. The VPN SPI adds the resources allocated to the client device to a resource pool in response to the client device being inactive in the VPN for the threshold time period.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC), a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration data, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, data, such as to an operator of the computing device 1000, such as a human user.

The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
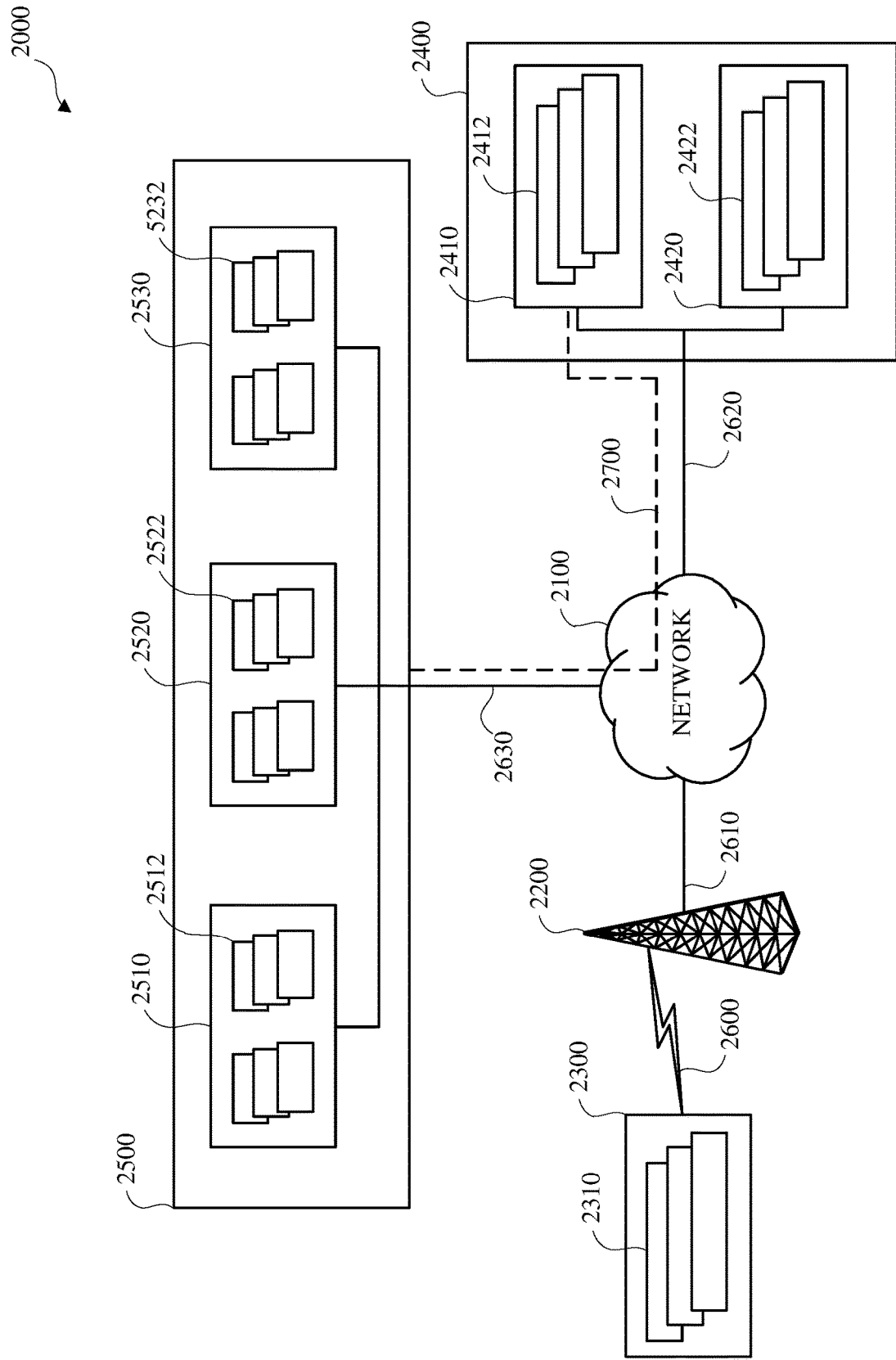
FIG. 2 is a block diagram of an example of a computing and communications system.

FIG. 2 is a diagram of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2530 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2530, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network (VPN). For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 1620, and the third communications link 1630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2530 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2530 may, respectively, be virtual devices operating on shared physical resources.

A tunnel includes software or hardware for transporting data across a network using protocols that are not supported by that network. Tunneling works by encapsulating packets—wrapping packets inside of other packets. A packet is a block of data transmitted over a network.

A VPN is a network security service that allows users to access the Internet or another public network as though they were connected to a private network, rather than the public network. The VPN encrypts Internet communications and provides a degree of anonymity. VPN(s) may be used to protect against snooping on public Wi-Fi® networks, to circumvent Internet censorship, or to connect to a business' internal network for the purpose of remote work.

Typically, to access network(s) (e.g., the Internet), a client device uses an Internet Service Provider (ISP) to provide access to the network(s). The ISP may include a cellular provider, a cable provider, a wired telephone provider, and/or the like. The ISP may provide software or hardware to facilitate access to the network(s) by the client device.

In some implementations, traffic over the network(s) is unencrypted and public. When a client device accesses a network connection, such as by visiting a website in a browser, the client device connects to the ISP, and then the ISP connects to the network(s) to find the appropriate web server to fetch the requested website.

Data about the user of the client device may be exposed in every operation of the website request. Since the IP address of the client device is exposed throughout the process, the ISP and any other intermediary can keep logs of the user's browsing habits. Additionally, the data flowing between the user's device and the web server may be unencrypted. This creates opportunities for malicious actors to spy on the data or perpetrate attacks on the user.

Conversely, a user connecting to the Internet using a VPN service may have a higher level of security and privacy.

A VPN connection may include the following operations. A client device first connects to the ISP using an encrypted connection. The ISP connects the client device to the VPN server, maintaining the encrypted connection. The VPN server decrypts the data from the client device and then connects to the Internet to access the web server in an unencrypted communication. The VPN server creates an encrypted tunnel connection with the client, known as a "VPN tunnel."

The VPN tunnel between the client device and VPN server passes through the ISP, but since all the data is encrypted, the ISP cannot access the activity of the client device. The VPN server's communications with other networks are unencrypted, but the other servers connected to the other networks only log the IP address of the VPN server, which does not give the other servers data about the user.

Figure 3:
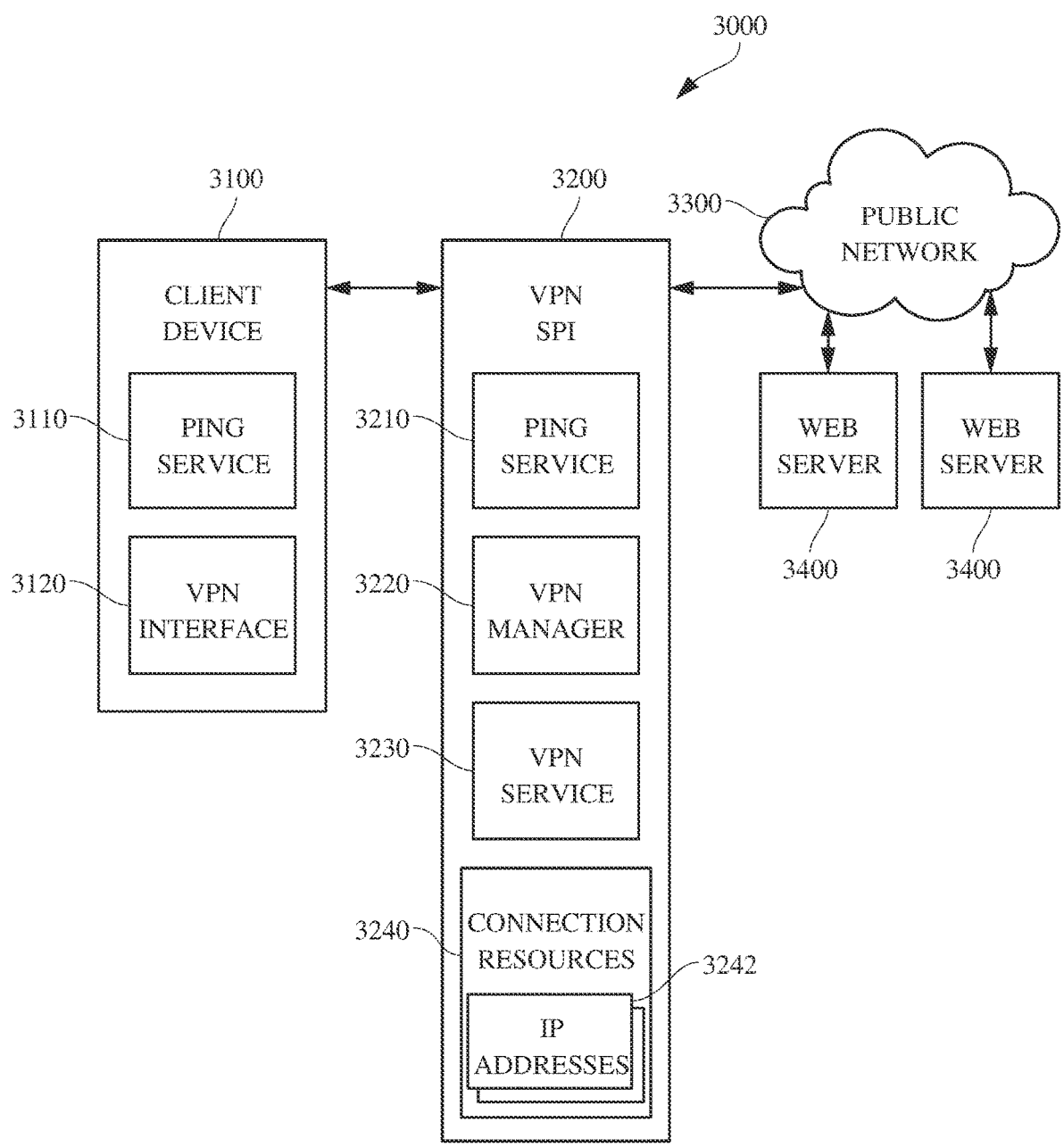
FIG. 3 is a block diagram of an example of a virtual private network (VPN) communication system.

FIG. 3 is a block diagram of an example of a VPN communication system 3000. As shown, the VPN communication system 3000 includes a client device 3100, VPN SPI 3200, a public network 3300, and web servers 3400.

The client device 3100 is a computing device, such as the computing device 1000 of FIG. 1 or the computing and communications devices 2300, 2410, 2420, 2510, 2520, 2530 of FIG. 2. The VPN SPI 3200 may include VPN servers, data repositories, or other infrastructure for providing networking services via a VPN, such as the VPN 2700 of FIG. 2. The VPN SPI 3200 may include a VPN control center, one or multiple servers of a VPN service provider, and/or one or more other machines of the VPN service provider. The public network 3300 may include one or more of the networks 2100, 2400, and 2500 shown in FIG. 2. The public network 3300 may include the Internet. A web server 3400 is a computing device, such as the computing device 1000 of FIG. 1 and/or the computing and communications devices 2300, 2410, 2420, 2510, 2520, 2530 of FIG. 2. A web server 3400 may host web pages or other data accessible via the public network 3300. The public network 3300 may include the Internet and/or other networks.

The VPN SPI 3200 may include infrastructure of a service provider to provide VPN services to client devices. The VPN SPI 3200 may include servers, databases, and other data repositories. As used herein, the term "address" may include a computer address in a computing protocol or any identifier of a location or a device on a network. An address may include an IP address or an address in another protocol.

As shown, the client device 3100 includes a ping service 3110 and a VPN interface 3120. The VPN SPI 3200 includes a ping service 3210, a VPN manager 3220, a VPN service 3230, and connection resources 3240. The connection resources 3240 include IP addresses 3242.

As used herein, the term "ping" may include a test for the reachability of an address (e.g., associated with a device, such as the client device) over a network. A device at the address may respond to the ping if the device is accessible and capable of communicating over the network. The device may fail to respond to the ping if the device is inaccessible, for example, due to a network failure or due to being powered off. A ping request may include an echo request packet, and a reply to the ping request may include an echo reply.

While the client device 3100 is connecting to a VPN associated with the VPN SPI, connected to the VPN, or attempting to reconnect to the VPN after the connection is lost, the ping service 3110 of the client device 3100 sends echo request packets to the VPN SPI 3200. If the VPN SPI 3200 is accessible, the ping service 3210 of the VPN SPI 3200 sends an echo reply in response to each received echo request packet (or a portion of the received echo request packets). Using the echo reply, the VPN SPI 3200 confirms, to the client device 3100, that the VPN SPI 3200 is accessible to the client device 3100 and capable of connecting the client device 3100 to a VPN of the VPN SPI 3200. More details of examples of the operation of the ping service 3110 of the client device 3100 and the ping service 3210 of the VPN SPI 3200 are provided below, for example, in conjunction with FIGS. 5A-5B.

The VPN interface 3120 of the client device 3100 is configured to generate a connection request for connecting to the VPN of the VPN SPI 3200 and to determine whether the client device 3100 is connected to the VPN. When the client device 3100 is connected to the VPN, the VPN interface 3120 may display, at a display unit of the client device, an icon indicating that the VPN is connected. More details of examples of the operation the VPN interface 3120 are provided below, for example, in conjunction with FIGS. 5A-5B.

The VPN manager 3220 of the VPN SPI 3200 allocates connection resources 3240, including an IP address 3242 and other resources, such as access to a specific VPN server or VPN tunnel, to the client device 3100 upon connection of the client device 3100 to the VPN. The connection resource 3240 include unallocated resources (stored in a connection resource pool) and allocated resources (stored in an allocated resource set) that are used by client devices to connect to the VPN of the VPN SPI 3200. Upon allocation of a resource, the resource is transferred from the connection resource pool to the allocated resource set.

The VPN manager 3220 verifies that the client device 3100 is active in the VPN, for example, via the ping service 3210 or via data transmitted to or received from the client device 3100. If the client device 3100 does not send echo request packets and does not transmit or receive data via the VPN for a threshold time (e.g., 5 minutes) the VPN manager 3220 determines that the client device 3100 is inactive in the VPN. In response, the connection resources 3240 assigned to the client device are added to the connection resource pool, and the client device may be disconnected from the VPN.

The VPN service 3230, upon receiving a connection request rom the client device 3100 and allocated resources (from the connection resource 3240) for the client device, connects the client device to the VPN using the allocated resources. The VPN service 3230 monitors the VPN activity of the client device to determine whether the client device is inactive, in the VPN, for at least the threshold time period. The monitoring may be based on timestamps (or other time indications) of data transmitted to or from the client device via the VPN or based on timestamps (or other time indications) of echo request packets received at the ping service 3210.

Figure 4:
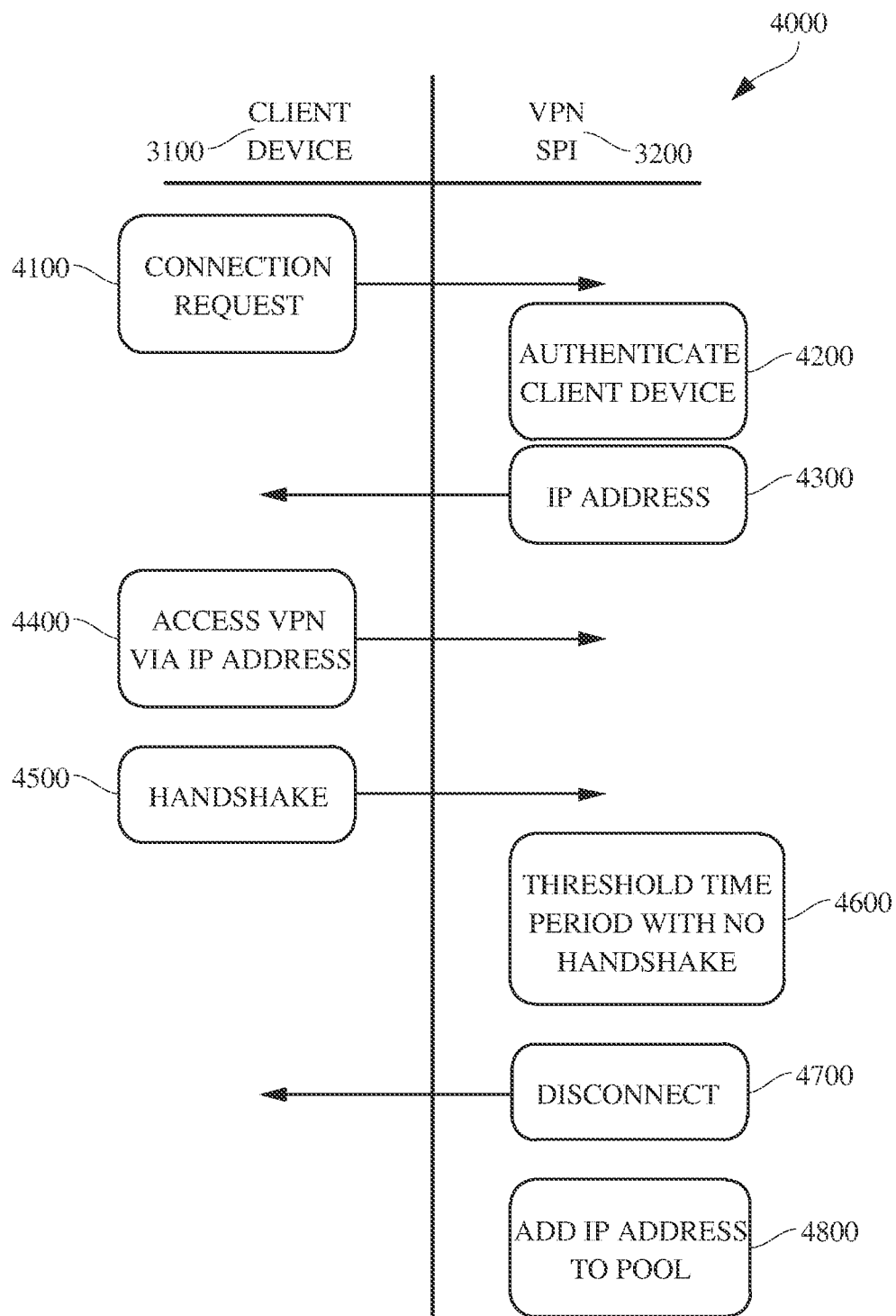
FIG. 4 is a flow diagram of an example of a method of VPN connection status detection.

FIG. 4 is a flow diagram of an example of a method of VPN connection status detection 4000. As shown, the VPN connection status detection 4000 is performed using the client device 3100 and the VPN SPI 3200.

At 4100, the client device 3100 transmits a connection request to the VPN SPI 3200. The connection request specifies that the client device 3100 requests to access a VPN of the VPN SPI. The connection request may specify a VPN service provider of the VPN and provide an identifier (e.g., a user identifier or account number) of a user of the client device that identifies the user of the client device to the VPN service provider. Responsive to receiving the connection request, at 4200, the VPN SPI 3200 authenticates the client device by verifying that an account used, by the client device, to login to a VPN service is a valid account. The authentication may be based on a JavaScript token received from the client device. The JavaScript token may be a JavaScript Object Notation (JSON) Web Token (JWT). The VPN SPI 3200 periodically (e.g., once per month) updates the token of the client device, and provides updated tokens to the client device if the account of the user of the client device is still valid. This ensures that only devices that are associated valid accounts of the VPN service provider access the VPN via the VPN SPI.

At 4300, in response to the connection request, the VPN SPI 3200 selects an IP address for access to the VPN by the client device 3100 from a pool of IP addresses. The pool of IP addresses includes a subset of the IP addresses 3242 that are not currently in use by other devices to access the VPN. The pool of IP addresses corresponds to an account tier of a user of the client device. For example, a user with a "premium" account tier might have access to a different pool of IP addresses than a user with a "basic" account tier. Alternatively, there might be more than two account tiers, for example, "bronze," "silver," and "gold," and "platinum." In one example, the VPN service has a free account tier and a paid account tier. The free account tier has access to a first pool of IP addresses located in Michigan. The paid account tier has access to a second pool of IP addresses located in Michigan, Mexico, and France. The user of the paid account tier may benefit from having access to IP addresses in multiple different geographic locations.

At 4400, the client device 3100 accesses the VPN via the IP address. The client device transmits data (e.g., a uniform resource locator address of a webpage to access) to the IP address, and the VPN SPI 3200 forwards the data, from the IP address, to a web server 3400 via the public network 3300. The web server 3400 transmits a response (e.g., data of the webpage) to the IP address, and the VPN SPI 3200 transmits the response received at the IP address to the client device 3100. The IP address is reserved for use solely by the client device (and not by other devices) from a time when the client device is provided access to the VPN until a time when the client device is disconnected from the VPN. The client device 3100 may be the one and only device using the IP address. In some implementations, the IP address is not assigned to any devices aside from the client device 3100 during the time period when the client device 3100 accesses the VPN via the IP address.

At 4500, the client device 3100 transmits one or more handshake notifications to the VPN SPI 3200, and the VPN SPI receives the one or more handshake notifications. The transmissions may be repeated periodically (e.g., once per threshold time period, where the threshold time period may be 30 seconds or another amount of time). The one or more handshake notifications are used by the VPN SPI 3200 to determine that the client device 3100 is actively communicating via the VPN and using the IP address that was allocated to the client device at 4200. The handshake notifications may include echo request packets transmitted by the ping service 3110 of the client device 3100 and received at the ping service 3210 of the VPN SPI 3200. Alternatively, the ping service 3210 of the VPN SPI 3200 may transmit an echo request packet to the ping service 3110 of the client device 3100, and the client device 3100 may transmit an echo reply, which is received at the VPN SPI 3200, in response may correspond to the handshake notification. In some implementations, the handshake notifications may include requests, from the client device 3100, to download or upload data via the VPN. The VPN SPI 3200 may store a timestamp associated with each received handshake notification (or a portion of the received notifications) from the client device 3100.

At 4600, the VPN SPI 3200 determines that a threshold time period (e.g., 5 minutes) has passed with no handshake notifications (where handshake notifications may include echo packets or data communications) since the latest-in-time handshake notification from the client device 3100. For example, if a latest-in-time handshake notification were received at 16:21:12 on Jan. 1, 2022, and the current time is 16:26:30 on Jan. 1, 2022, then five minutes and 18 seconds have passed since the last handshake notification. For example, the VPN SPI 3200 may compute a time difference between a current time and a time indicated in a timestamp of the latest-in-time handshake notification from the client device 3100. In some cases, the time difference is computed periodically (e.g., every 10 minutes). The threshold time period may pass with no handshake notifications, for example, because the client device 3100 is offline, a part of the VPN SPI 3200 is offline, or there is a connection error between the client device 3100 and the VPN SPI 3200.

At 4700, the VPN SPI 3200 disconnects the client device 3100 from the VPN in response to determining that the threshold time period has passed with no handshake notifications. The VPN SPI 3200 may stop allocating resources to the client device 3100 for VPN communication and stop processing VPN communications from the client device 3100. The VPN SPI 3200 may transmit a message to an address of the client device 3100 that the client device is being disconnected from the VPN and could reconnect to continue using the VPN. (If the client device 3100 is offline, the client device 3100 might not receive the message until the client device reconnects to a network.) The message may be displayed via an icon, a push notification, or a browser notification at the client device 3100.

At 4800, the VPN SPI 3200 adds the IP address selected for the client device 3100 to the pool of IP addresses in response to disconnecting the client device 3100 from the VPN. For example, the pool may be a data structure, such as an array or a list, that includes IP addresses that are available for devices to use to connect to the VPN. IP addresses may be added to or removed from the pool data structure. As a result, the IP address becomes available to other devices accessing the VPN via the VPN SPI 3200. The client device 3100 may later reconnect to the VPN and be assigned a different IP address from the pool of IP addresses.

Figure 5A:
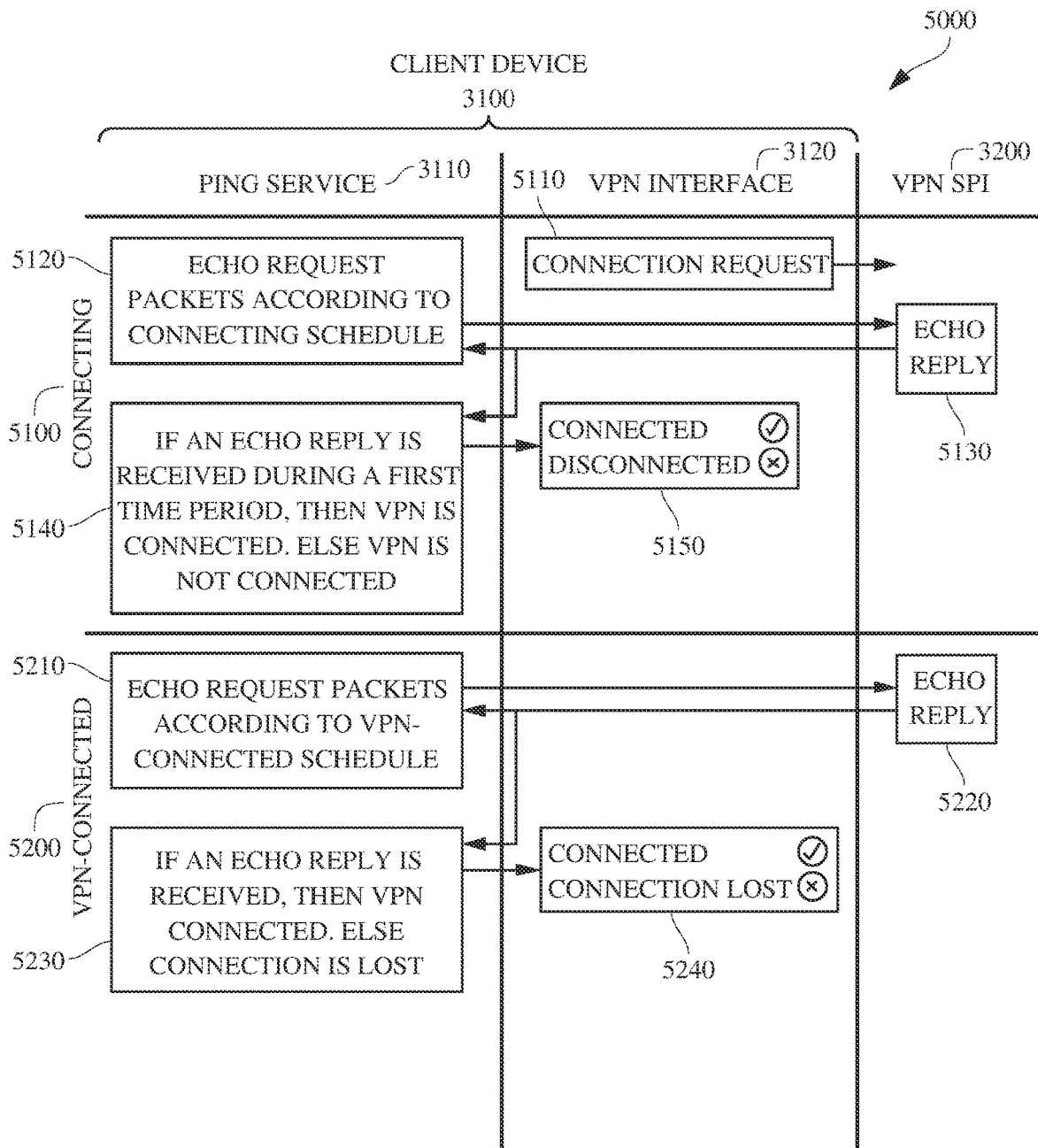
FIGS. 5A-5B are a flow diagram of an example of a method of VPN connection management of a client device.
Figure 5B:
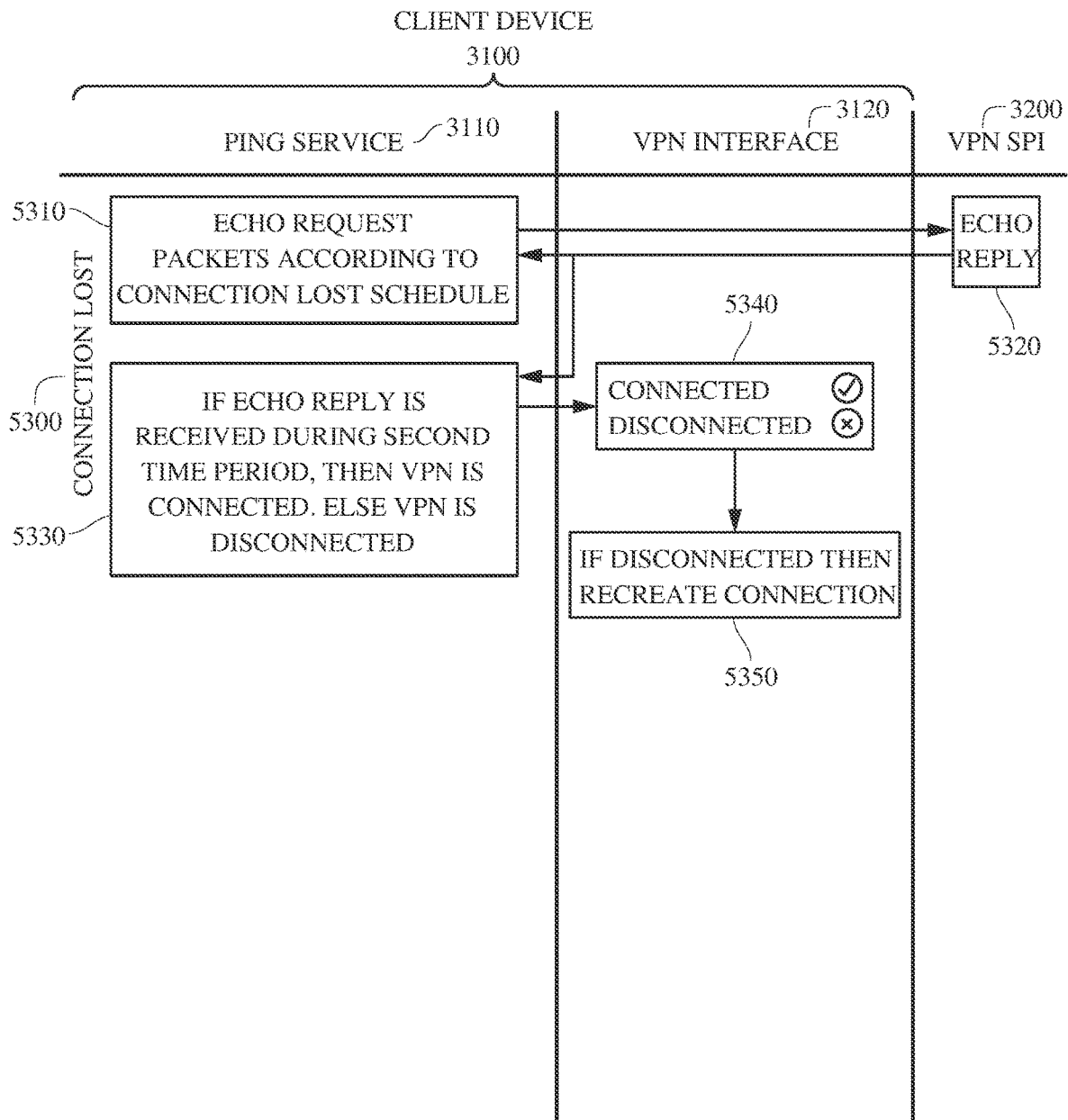

FIGS. 5A-5B are a flow diagram of an example of a method of VPN connection management 5000 of the client device 3100. As shown, VPN connection management 5000 is implemented using the client device 3100, which includes the ping service 3110 and the VPN interface 3120, and the VPN SPI 3200. As shown, VPN connection management 5000 of VPN connection management includes three phases—a connecting phase 5100 and a VPN-connected phase 5200 shown in FIG. 5A, and a connection lost phase 5300 shown in FIG. 5B.

As shown in FIG. 5A, in the connecting phase 5100, the client device 3100 attempts to connect to a VPN of the VPN SPI 3200 (e.g., in response to a user input), for example, by opening a VPN application at the client device 3100 or selecting the VPN from a list of available networks, the VPN interface 3120 sends a connection request to the VPN SPI 3200 at 5110. The VPN interface 3120 of the client device 3100 transmits the VPN connection request to an address of the VPN SPI. While connection request of 5110 is pending (i.e., after the connection was requested but before the client device 3100 is connected to the VPN), at 5120, the ping service 3110 sends echo request packets to the VPN SPI 3200 according to a connecting schedule (e.g., one echo request packet per 0.5 seconds). At 5130, the VPN SPI 3200 sends an echo reply to one or more of the echo request packets, for example, using the ping service 3210 of the VPN SPI 3200.

At 5140, the ping service 3110 determines whether an echo reply is received during a first time period (e.g., one minute) since transmission of the connection request at 5110. In some implementations, the ping service 3110 determines that the echo reply was received. In response to receiving the echo reply, at 5150, the VPN interface 3120 determines that the VPN is connected and VPN connection management 5000 continues to the VPN-connected phase 5200. In some implementations, the ping service 3110 determines that the first time period has elapsed and no echo reply was received. In response to the passage of the first time period without receipt of the echo reply, at 5150, the VPN interface 3120 determines that the VPN is not connected, and the user of the client device 3100 may be notified, for example, via a graphical user interface of the client device 3100 (or via another interface of the client device 3100, such as an audio interface), that the VPN is not available.

As described above, the ping service 3110 transmits one or more echo request packets (per 5120) to the address of the VPN SPI according to a connecting schedule from after the VPN connection request (of 5110) is transmitted until an echo reply (of 5130) is received, at the client device 3100. The echo reply (of 5130) is responsive to an echo request packet from the one or more echo request packets (of 5120). In response to receiving the echo reply, the VPN interface 3120 of the client device 3100 determines that the VPN connection is established, and the VPN-connected phase 5200 is entered.

In the VPN-connected phase 5200, at 5210, the ping service 3110 of the client device 3100 sends, to the VPN SPI 3200, echo request packets according to a VPN-connected schedule (e.g., one echo request packet per 30 seconds). At 5220, the VPN SPI 3200 sends an echo reply to one or more of the echo request packets, for example, using the ping service 3210 of the VPN SPI 3200. At 5230, the ping service 3110 determines if an echo reply (of 5220) is received in response to an echo request packet (of 5210). If the echo reply is received, at 5240, the VPN interface 3120 determines that the VPN is still connected and the VPN-connected phase 5200 continues. If the echo reply is not received for a threshold time period (e.g., one minute) since the last echo reply was received, at 5240, the VPN interface 3120 determines that the VPN connection is lost (in other words, the VPN connection is disconnected subsequent to the VPN connection having been established). In response to determining that the VPN connection is lost, the connection lost phase 5300 described in conjunction with FIG. 5B begins.

As shown in FIG. 5B, in the connection lost phase 5300, at 5310, the ping service 3110 of the client device 3100 sends, to the VPN SPI 3200, echo request packets according to a connection lost schedule. The client device 3100, using the VPN interface 3120, may transmit a reconnection request to the address of the VPN SPI 3200, where the reconnection request indicates that the client device 3100 is to be reconnected to the VPN. The connection lost schedule may include, for example, sending an echo request packet 2 seconds after the prior echo request packet was send, then another echo request packet 4 seconds later, then another echo request packet 8 seconds later, then another echo request packet 16 seconds later, then one packet every 30 seconds. At 5320, the VPN SPI 3200 sends an echo reply to one or more of the echo request packets, for example, using the ping service 3210 of the VPN SPI 3200.

At 5330, the ping service 3110 determines if an echo reply (of 5320) is received in response to an echo request packet (of 5310). If the echo reply is received during a second time period (e.g., within 3 minutes), at 5240, the VPN interface 3120 determines that the VPN is reconnected and the VPN-connected phase 5200 is reentered. If the echo reply is not received during the second time period, after the second time period is over, at 5240, the VPN interface 3120 determines that the VPN is disconnected. Upon determining that the VPN is disconnected, at 5350, the VPN interface 3120 recreates the connection. The connection may be recreated automatically (e.g., after waiting a certain time after the VPN is disconnected to ensure that the disconnection is not due to temporary issues such as a router becoming temporarily disabled or a mobile device switching from a Wi-Fi® network to a cellular network) by returning to the connecting phase 5100—transmitting another connection request per 5110 and transmitting echo request packets to the address of the VPN SPI 3200 according to the VPN-connected schedule per 5120. Alternatively, the user may be notified, via a graphical user interface, that the VPN is disconnected, and the user may manually request to reconnect to the VPN. The client device 3100 may provide a graphical user interface element that indicates that the VPN connection is terminated or prompts a user to reconnect to the VPN.

According to some implementations, the connecting schedule differs from the VPN-connected schedule, the connecting schedule differs from the connection lost schedule, and the VPN-connected schedule differs from the connection lost schedule. In some implementations, transmitting according to the connecting schedule comprises transmitting one echo request packet per 0.25-0.75 seconds (e.g., 0.5 seconds), and the VPN-connected schedule comprises transmitting one echo request packet every 20-40 seconds (e.g., 30 seconds). According to some implementations, transmitting according to the connection lost schedule comprises transmitting echo request packets $2^n$ seconds since an immediately prior echo request packet was transmitted, where n is a total count of echo request packets transmitted since the connection was lost, while n is less than 5, and transmitting echo request packets every 30 seconds while n is greater than or equal to 5.

Figure 6:
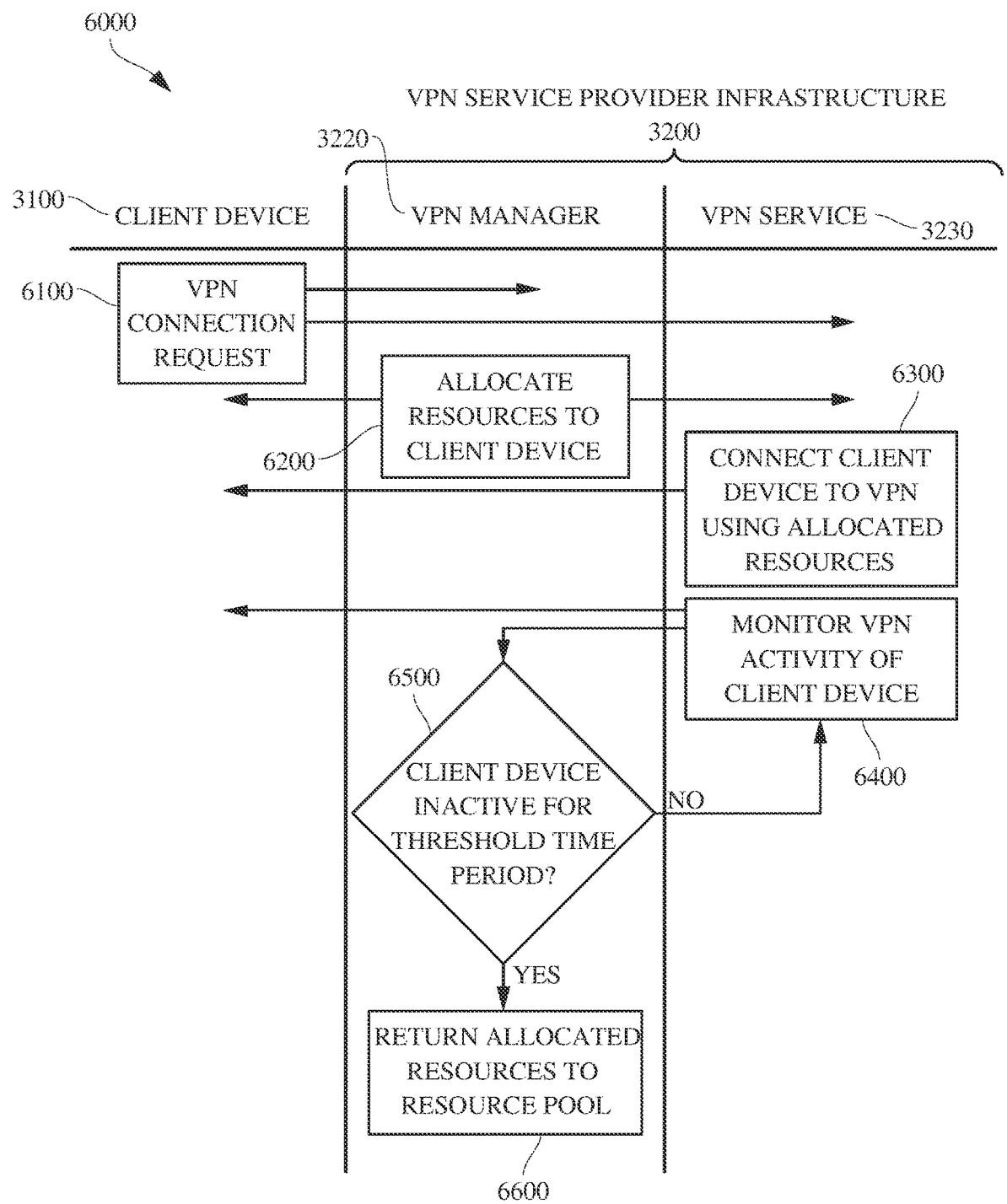
FIG. 6 is a flow diagram of an example of a method of allocating VPN resources to a client device.

FIG. 6 is a flow diagram of an example of a method for allocating VPN resources 6000 to the client device 3100. As shown, allocating VPN resources 6000 is implemented using the client device 3100 and the VPN SPI 3200, which includes the VPN manager 3220 and the VPN service 3230.

At 6100, the client device 3100 transmits a VPN connection request to the VPN SPI 3200. The VPN manager 3220 of the VPN SPI 3200 receives the VPN connection request. The VPN connection request may be similar to the connection request of 5110 of FIG. 5A. The VPN connection request may include authentication credentials for authenticating the client device with a VPN service provider and a certificate that identifies the VPN service provider for the VPN connection request.

At 6200, the VPN manager 3220 allocates resources from the VPN service 3230 to the client device 3100. The allocated resources may be selected from a pool of the connection resources 3240 and may include an IP address from the IP addresses 3242. The allocated resources are used by the client device 3100 to connect to a VPN of the VPN service provider. When resources are allocated to the client device 3100 (or other devices), the resources that are allocated are removed from the pool to ensure that at most one device is assigned to each resource. When a device disconnects (or is disconnected) from the VPN, the resources assigned to that device are added to the pool, for possible reassignment to another device connecting to the VPN.

At 6300, the VPN service 3230 connects the client device 3100 to the VPN using the allocated resources. The client device 3100 may transmit or received data over the VPN. The allocated resources are assigned to the client device 3100 and are not assigned to other devices while the allocated resources are being used by the client device 3100.

At 6400, the VPN service 3230 monitors VPN activity of the client device 3100. The VPN service 3230 may record timestamps associated with echo request packets, echo responses, uploads, or downloads via the VPN of the client device 3100. As a result, the VPN service 3230 may be able to determine an amount of time since the client device 3100 was last active in the VPN.

At 6500, the VPN manager 3220 determines whether the client device 3100 has been inactive in the VPN for at least a threshold time period (e.g., 5 minutes). For example, the VPN manager 3220 may compute a time difference between a current time and a latest recorded timestamp associated with activity of the client device 3100 in the VPN. If the client device 3100 has been inactive in the VPN for at least the threshold time period, allocating VPN resources 6000 continues to 6600. If the client device 3100 has not yet been inactive in the VPN for at least the threshold time period, allocating VPN resources 6000 returns to 6400.

At 6600, upon determining that the client device 3100 has been inactive in the VPN for at least the threshold time period, the VPN manager 3220 adds the allocated resources to the pool. Once added to the pool, the allocated resources may be assigned to another device connecting to the VPN. If the client device 3100 later reconnects to the VPN, other resources from the pool may be assigned to the client device 3100 to service the VPN connection of the client device 3100.

Figure 7:
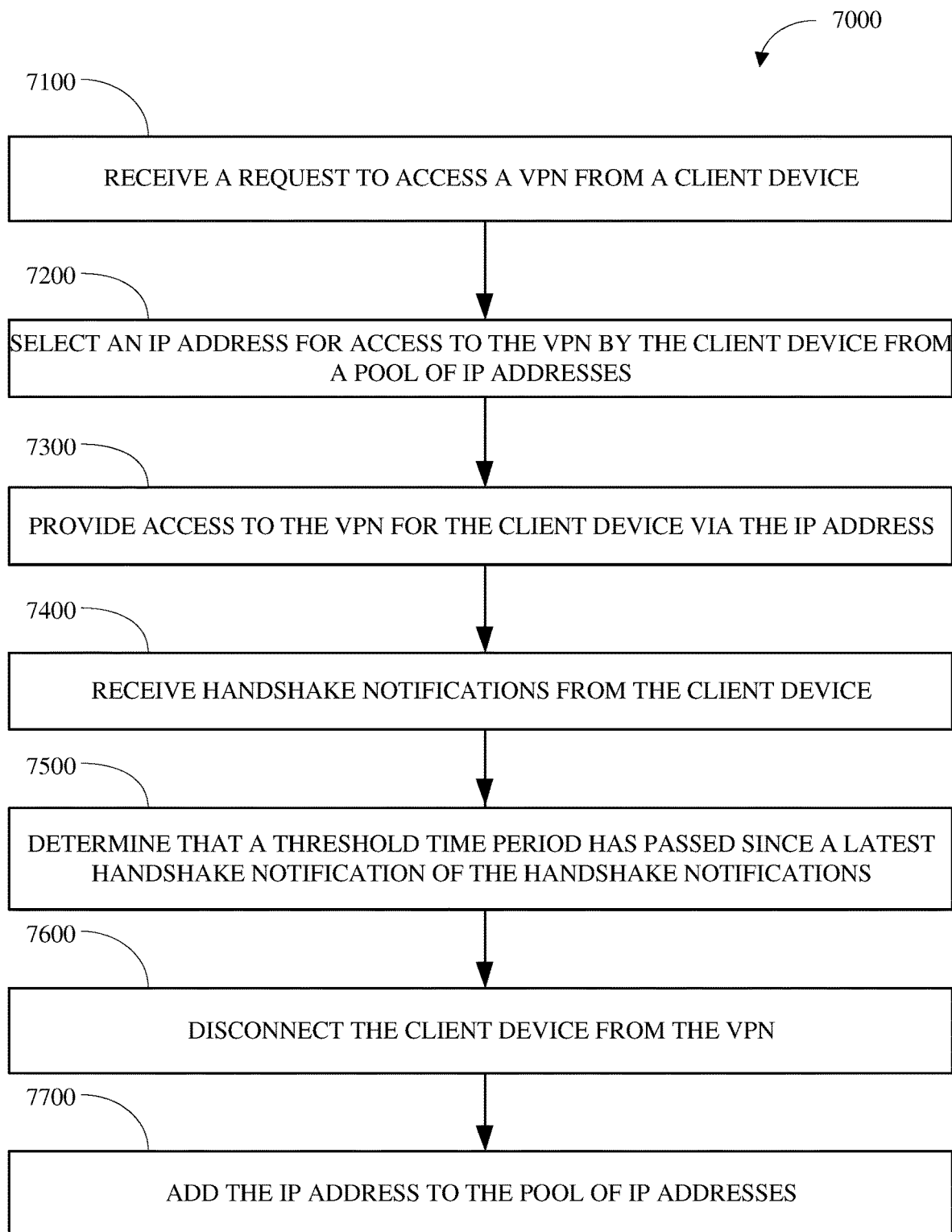
FIG. 7 is a flowchart of an example of a method of VPN connection status detection.

FIG. 7 is a flowchart of an example of a method 7000 of VPN connection status detection. The method 7000 may be implemented at VPN SPI (e.g., the VPN SPI 3200).

At 7100, the VPN SPI receives a request to access a VPN from a client device (e.g., the client device 3100). The VPN SPI may authenticate the client device by verifying that an account used to login to a VPN service at the client device is a valid account. The request may be transmitted by a user of the client device opening a VPN application at the client device or selecting the VPN from a list of available networks using a graphical user interface of the client device.

At 7200, the VPN SPI selects an IP address for access to the VPN by the client device from a pool of IP addresses. The pool of IP addresses may include IP addresses of the VPN SPI for access to the VPN that are not currently in use by other devices connected to the VPN. In some implementations, the pool of IP addresses corresponds to an account tier of a user of the client device. The account tier may be a paid account or an unpaid account. Alternatively, the account tier may be associated with a tier of account (e.g., bronze, silver, gold, or platinum).

At 7300, the VPN SPI provides access to the VPN for the client device via the IP address. The client device may transmit network communications to the IP address and the VPN SPI may forward the network communications to a public network (e.g., the public network 3300) from the IP address. The VPN SPI may receive responses to the network communications at the IP address, and may transmit those responses to the client device.

At 7400, the VPN SPI receives handshake notifications from the client device. Each handshake notification (or a portion of the handshake notifications) may be associated with a timestamp. A handshake notification may be at least one of an echo request packet, an echo reply, a download of data, or an upload of data. The handshake notifications may be received periodically, for example, once every 35 seconds or once every 1-2 minutes. To receive a handshake notification, the VPN SPI may transmit an echo request packet to the client device and receive an echo reply in response to the echo request packet, where the echo reply is the handshake notification.

At 7500, the VPN SPI determines that a threshold time period has passed since a latest-in-time handshake notification of the handshake notifications. For example, the VPN SPI may compute a time difference between the current time and a time associated with the latest-in-time handshake notification. The VPN SPI may determine whether the computed time difference exceeds the threshold time period.

At 7600, the VPN SPI disconnects the client device from the VPN in response to determining that the threshold time period has passed. The VPN SPI may transmit, to the client device, a notification that the client device is no longer connected to the VPN. In response, the client device may attempt to reconnect to the VPN and/or the client device may connect directly to the public network.

At 7700, the VPN SPI adds the IP address to the pool of IP addresses in response to disconnecting the client device from the VPN. The IP address is reserved for use solely by the client device (and not by any other devices connected to the VPN) from a time when the client device is provided access to the VPN until a time when the client device is disconnected from the VPN. When the client device reconnects to the VPN via the VPN SPI, another IP address from the pool may be assigned to the client device.

Figure 8:
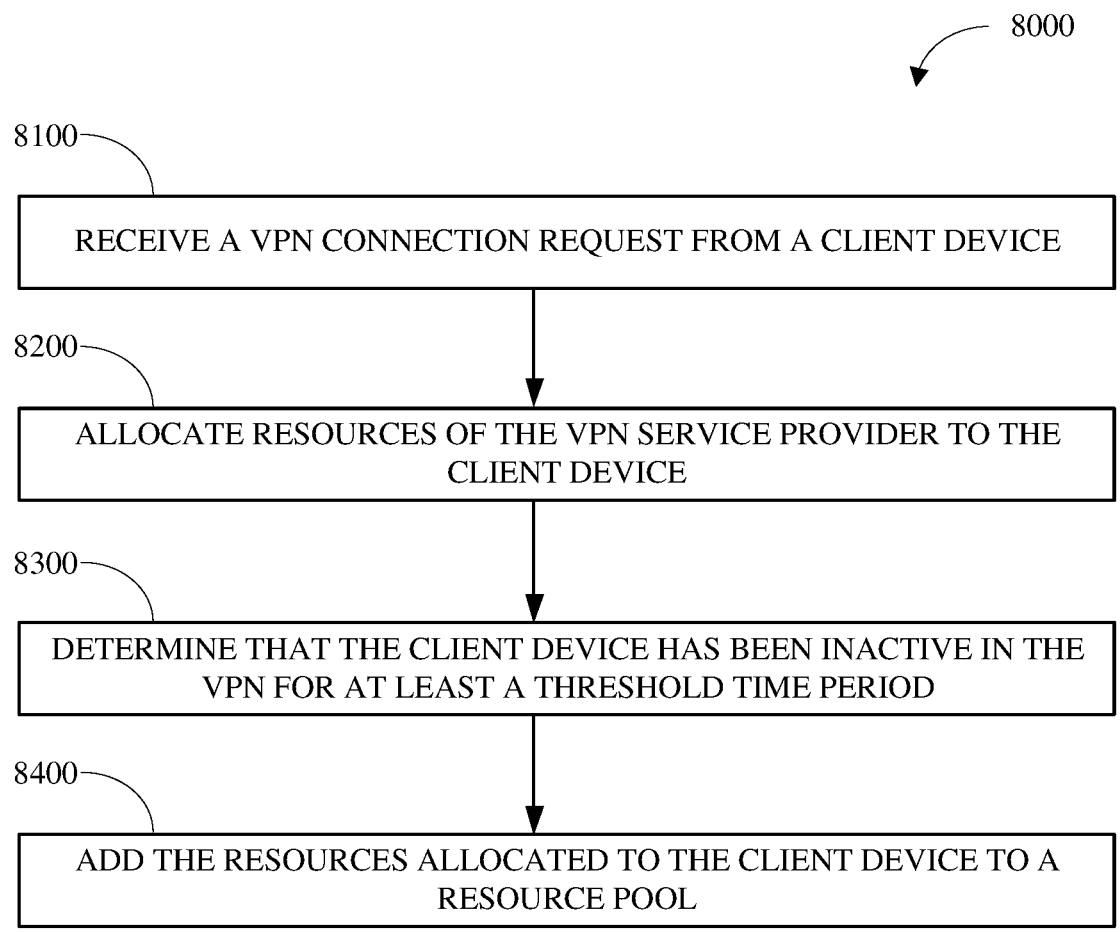
FIG. 8 is flowchart of an example of a method of allocating VPN resources to a client device.

FIG. 8 is flowchart of an example of a method 8000 of allocating VPN resources to a client device (e.g., the client device 3100). The method 800 may be implemented at a machine (or multiple machines) of a VPN SPI (e.g., the VPN SPI 3200). The machine may include one or more servers.

At 8100, the machine receives a VPN connection request from a client device. The VPN connection request comprises authentication credentials (e.g., a user identifier and a password) for authenticating the client device with a VPN service provider and a certificate that identifies the VPN service provider for the VPN connection request. The certificate may include a JavaScript token (e.g., a JWT) that identifies public information (e.g., an IP address or a public key) of the client device. In some cases, the token expires every threshold number of days (e.g., 30 days). The VPN SPI provides an update to the token to the client device every threshold number of days if the user of the client device maintains an account (e.g., by paying a subscription fee) with the VPN service of the VPN SPI.

At 8200, the machine allocates resources of the VPN service provider to the client device to cause the client device to be connected to a VPN of the VPN service provider. The machine may verify the authentication credentials and the certificate of the client device. The allocated resources may be provided to the client device in response to verifying the authentication credentials and the certificate.

At 8300, the machine determines that the client device has been inactive in the VPN for at least a threshold time period based on monitoring VPN activity of the client device. To monitor the VPN activity of the client device, the machine of the VPN SPI uses a ping service (e.g., the ping service 3210) to periodically (e.g., once every 20 seconds) send echo request packets the client device. The machine of the VPN SPI determines that the client device has been inactive in the VPN for at least the threshold time period based on the client device failing to send an echo reply to an echo request packet of the echo request packets from the ping service during the threshold time period.

At 8400, the machine adds the resources allocated to the client device to a resource pool in response to the client device having been inactive in the VPN for the threshold time period. In some implementations, the machine logs a timestamp associated with each VPN activity item (e.g., upload or download) of the client device (or a portion of the VPN activity items of the client device). The machine determines that a time difference between a current time and a latest timestamp of the logged timestamps exceeds the threshold time period to determine that the client device has been inactive in the VPN for the threshold time period.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    transmitting, by a client device, a request to connect to a virtual private network (VPN);
    receiving, in response to the request, an Internet Protocol (IP) address to use to access the VPN and an indication that the client device has been connected to the VPN;
    receiving one or more handshake notifications from a VPN server associated with the IP address;
    determining that a threshold time period has passed since a latest-in-time handshake notification of the one or more handshake notifications, wherein the threshold time period is determined according to a schedule selected based on a connection status between the client device and the VPN; and
    in response to determining that the threshold time period has passed since the latest-in-time handshake notification of the one or more handshake notifications:
        determining, at the client device, that the client device has been disconnected from the VPN; and displaying, via the client device, a graphical user interface (GUI) element indicating that the client device is no longer connected to the VPN.

2. The method of claim 1, wherein the handshake notification comprises an echo request packet or an echo reply packet.

3. The method of claim 1, wherein the VPN server is associated with multiple IP addresses, including the IP address, for accessing the VPN.

4. The method of claim 1, further comprising:
accessing, by the client device, the VPN by transmitting data to the IP address or receiving data from the IP address.

5. The method of claim 1, further comprising:
attempting to reconnect the client device to the VPN in response to a user input received after determining that the client device has been disconnected from the VPN.

6. The method of claim 5, wherein the GUI element prompts a user of the client device to provide the user input.

7. The method of claim 5, wherein the user input comprises a selection, via the client device, of the VPN from a list of available networks.

8. The method of claim 1, wherein the schedule comprises multiple phases including a VPN-connected phase and a connection lost phase, wherein the schedule is in a VPN-connected phase when the client device is connected to the VPN, wherein, upon the client device losing connection to the VPN, the schedule switches to a connection lost phase specifying that a time difference between transmission, by the client device, of at least one pair of successive handshake notification requests is an exponential function of a number of packets sent since the connection was lost.

9. A client device comprising:
a non-transitory memory storing instructions; and
a processor that executes the instructions to:
transmit a request to connect to a virtual private network (VPN);
receive, in response to the request, an Internet Protocol (IP) address to use to access the VPN and an indication that the client device has been connected to the VPN;
receive one or more handshake notifications from a VPN server associated with the IP address;
determine that a threshold time period has passed since a latest-in-time handshake notification of the one or more handshake notifications, wherein the threshold time period is determined according to a schedule selected based on a connection status between the client device and the VPN; and
in response to determining that the threshold time period has passed since the latest-in-time handshake notification of the one or more handshake notifications:
determine that the client device has been disconnected from the VPN; and
display a graphical user interface (GUI) element indicating that the client device is no longer connected to the VPN.

10. The client device of claim 9, wherein the handshake notification comprises an echo request packet or an echo reply packet.

11. The client device of claim 9, wherein the VPN server is associated with multiple IP addresses, including the IP address, for accessing the VPN.

12. The client device of claim 9, wherein the processor further executes the instructions to:
access the VPN by transmitting data to the IP address or receiving data from the IP address.

13. The client device of claim 9, wherein the processor further executes the instructions to:
attempt to reconnect the client device to the VPN in response to a user input received after determining that the client device has been disconnected from the VPN.

14. The client device of claim 13, wherein the GUI element prompts a user of the client device to provide the user input.

15. The client device of claim 13, wherein the user input comprises a selection, via the client device, of the VPN from a list of available networks.

16. A non-transitory computer readable medium storing instructions that, when executed by a computer, cause the computer to perform operations comprising:
transmitting, by a client device, a request to connect to a virtual private network (VPN);
receiving, in response to the request, an Internet Protocol (IP) address to use to access the VPN and an indication that the client device has been connected to the VPN;
receiving one or more handshake notifications from a VPN server associated with the IP address;
determining that a threshold time period has passed since a latest-in-time handshake notification of the one or more handshake notifications, wherein the threshold time period is determined according to a schedule selected based on a connection status between the client device and the VPN; and
in response to determining that the threshold time period has passed since the latest-in-time handshake notification of the one or more handshake notifications:
determining, at the client device, that the client device has been disconnected from the VPN; and
displaying, via the client device, a graphical user interface (GUI) element indicating that the client device is no longer connected to the VPN.

17. The computer readable medium of claim 16, wherein the handshake notification comprises an echo request packet or an echo reply packet.

18. The computer readable medium of claim 16, wherein the VPN server is associated with multiple IP addresses, including the IP address, for accessing the VPN.

19. The computer readable medium of claim 16, the operations further comprising:
accessing, by the client device, the VPN by transmitting data to the IP address or receiving data from the IP address.

20. The computer readable medium of claim 16, the operations further comprising:
attempting to reconnect the client device to the VPN in response to a user input received after determining that the client device has been disconnected from the VPN.

21. The computer readable medium of claim 20, wherein the GUI element prompts a user of the client device to provide the user input.

* * * * *